United States Patent [19]

Deines et al.

[11] Patent Number: 5,122,990
[45] Date of Patent: Jun. 16, 1992

[54] BOTTOM TRACKING SYSTEM

[75] Inventors: Kent L. Deines, Poway; Steve J. Maier, San Diego, both of Calif.

[73] Assignee: Rowe-Deines Instruments Incorporated, San Diego, Calif.

[21] Appl. No.: 649,858

[22] Filed: Feb. 1, 1991

[51] Int. Cl.$^5$ .............................................. G01S 15/00
[52] U.S. Cl. ........................................ 367/100; 367/89
[58] Field of Search ........................ 367/89, 100, 99; 364/516

[56] References Cited

U.S. PATENT DOCUMENTS

| | | | |
|---|---|---|---|
| 3,903,406 | 9/1975 | London | 364/821 |
| 4,054,862 | 10/1977 | Backman, Jr. | 367/100 |
| 4,109,100 | 8/1978 | Unkauf | 375/54 |
| 4,118,686 | 10/1978 | Lender | 375/19 |
| 4,187,000 | 2/1980 | Constant | 364/820 |
| 4,207,620 | 6/1980 | Morgera | 367/100 |
| 4,222,049 | 9/1980 | Sirven et al. | 342/91 |
| 4,270,180 | 5/1981 | Charlton | 367/127 |
| 4,271,707 | 6/1981 | Lakin | 73/614 |
| 4,287,578 | 9/1981 | Heyser | 367/102 |
| 4,313,170 | 1/1982 | Lewis et al. | 342/201 |
| 4,315,263 | 2/1982 | Neidell | 342/451 |
| 4,372,239 | 2/1983 | Hagelberg et al. | 367/96 |
| 4,373,190 | 2/1983 | Lewis et al. | 364/715.02 |
| 4,404,665 | 9/1983 | Kits van Heyningen | 367/100 |
| 4,424,943 | 1/1984 | Zwirn et al. | 364/462 |
| 4,470,048 | 9/1984 | Short, III | 342/189 |
| 4,476,874 | 10/1984 | Taenzer et al. | 128/661.1 |
| 4,509,048 | 4/1985 | Jain | 342/25 |
| 4,564,841 | 1/1986 | Neidell | 367/13 |
| 4,626,854 | 12/1986 | Kretschmer, Jr. et al. | 342/196 |
| 4,686,532 | 8/1987 | McAulay | 367/87 |
| 4,692,603 | 9/1987 | Brass et al. | 235/454 |
| 4,719,584 | 1/1988 | Rue et al. | 364/516 |
| 4,739,186 | 4/1988 | Crookshanks | 307/106 |
| 4,849,906 | 7/1989 | Chodos et al. | 364/516 |
| 4,855,964 | 8/1989 | Fanning et al. | 367/159 |
| 4,906,940 | 3/1990 | Greene et al. | 382/16 |
| 4,944,036 | 7/1990 | Hyatt | 367/43 |
| 4,953,143 | 8/1990 | Higgins et al. | 367/88 |

OTHER PUBLICATIONS

Helstrom, *Statistical Theory of Signal Detection*, 1968, Pergamon Press, pp. 112-115.
Panter, *Modulation, Noise, and Spectral Analysis*, 1965, McGraw-Hill, pp. 730-733.

Primary Examiner—Daniel T. Pihulic
Attorney, Agent, or Firm—Knobbe, Martens, Olson & Bear

[57] ABSTRACT

A system and method for bottom tracking in a sonar system. The present invention provides for convolving the received signal with the second derivative, or an approximation thereof, of the matched transmitted pulse. In another aspect of the invention, the received signal is convolved with the matching transmitter pulse and the result is evaluated by summing the differences between a central peak and its neighboring left and right values. The filtering of the present invention removes the effect of water absorption on signal amplitude. The invention also includes compensating for spreading loss in the received signal.

16 Claims, 6 Drawing Sheets

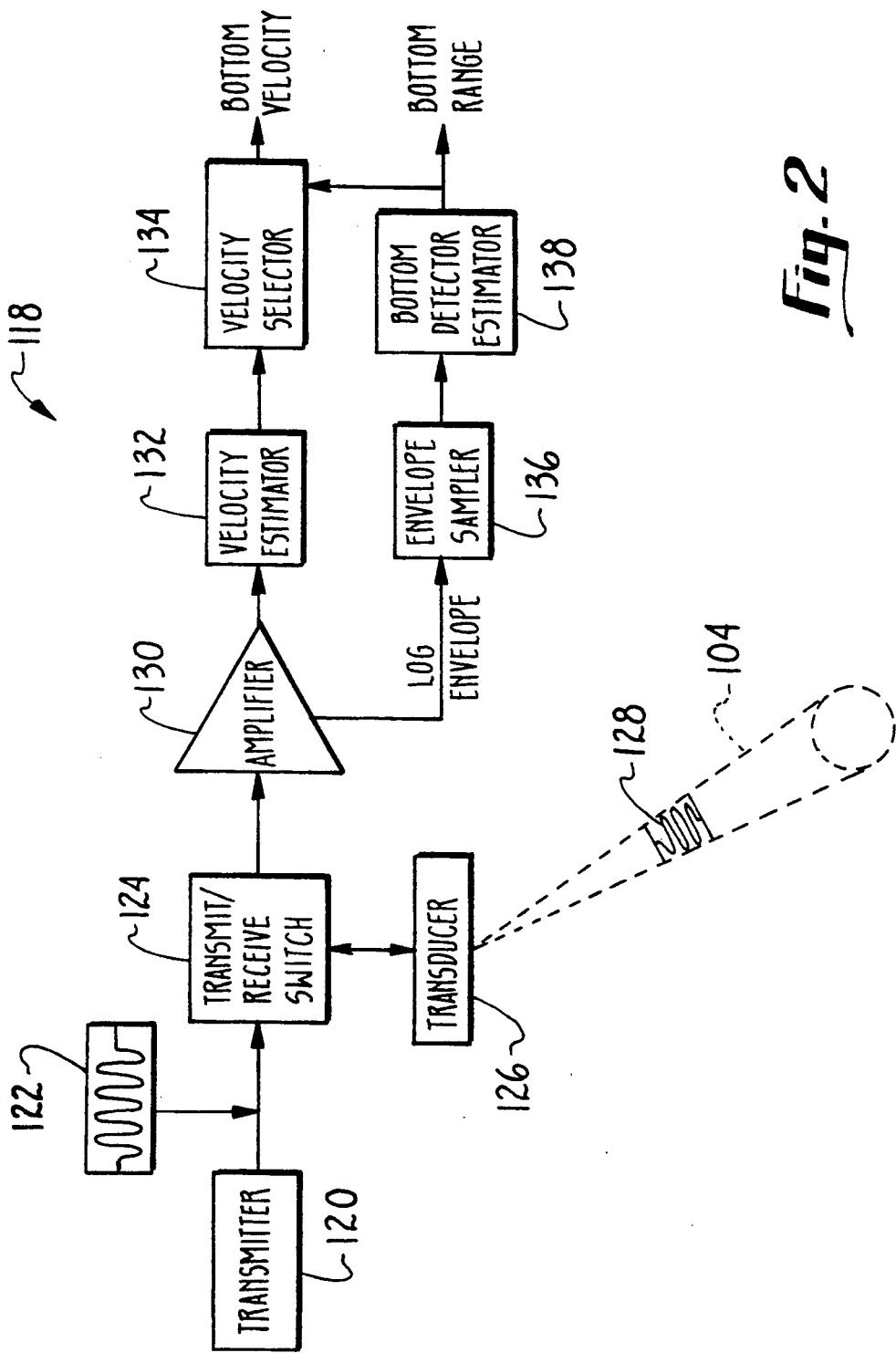

BOTTOM TRACKING SYSTEM

BACKGROUND OF THE INVENTION

1. Field of the Invention

The present invention relates to velocity measurement systems and, more particularly, to sonar systems performing bottom tracking.

2. Description of the Prior Art

A current profiler is a type of sonar system that is used to remotely measure water velocity over varying ranges. Current profilers are used in freshwater environments such as rivers, lakes and estuaries, as well as in saltwater environments such as the ocean, for studying the effects of current velocities. The measurement of accurate current velocities is important in such diverse fields as weather prediction, biological studies of nutrients, environmental studies of sewage dispersion, and commercial exploration for natural resources, including oil.

Typically, current profilers are used to measure current velocities in a vertical column of water for each depth "cell" of water up to a maximum range, thus producing a "profile" of water velocities. The general profiler system includes a transducer to generate pulses of sound (which when downconverted to human hearing frequencies sound like "pings") that backscatter as echoes from plankton, small particles, and small-scale inhomogeneities in the water. The received sound has a Doppler frequency shift proportionate to the relative velocity between the scatters and the transducer.

The physics for determining a single velocity vector component ($v_x$) from such a Doppler frequency shift may be concisely stated by the following equation:

$$v_x = \frac{cf_D}{2f_T \cos\theta} \quad (1)$$

In equation (1), c is the velocity of sound in water, about 1500 meters/second. Thus, by knowing the transmitted sound frequency, $f_T$, and declination angle of the transmitter transducer, $\theta$, and measuring the received frequency from a single, narrowband pulse, the Doppler frequency shift, $f_D$, determines one velocity vector component. Relative velocity of the measured horizontal "slice", or depth cell, is determined by subtracting out a measurement of vessel earth reference velocity, $v_e$. Earth reference velocity can be measured by pinging the ocean bottom whenever it comes within sonar range or by a navigation system such as LORAN or GPS.

Commercial current profilers are typically configured as an assembly of four diverging transducers, spaced at 90° azimuth intervals from one another around the electronics housing. This transducer arrangement is known in the technology as the Janus configuration. A three beam system permits measurements of three velocity components, $v_x$, $v_y$ and $v_z$ (identified respectively as u, v, w in oceanographic literature) under the assumption that currents are uniform in the plane perpendicular to the transducers mutual axis. However, four beams are often used for redundancy and reliability. The current profiler system may be attached to the hull of a vessel, remain on stationary buoys, or be moored to the ocean floor.

Of particular importance to the vessel mounted current profiler is the accurate determination of vessel velocity. The earth reference water velocities can then be calculated by subtracting out the vessel velocity. As is well-known, the movement of the vessel with respect to the earth is based on establishing at least two fixed reference points over a period of time. In a current profiler, one common technique to find the bottom is to interleave a bottom range pulse with the current velocity pulses. The bottom range pulse is generally of a longer duration than other pulses so as to fully ensonify the bottom. The length of the pulse is chosen according to the assumed maximum depth and the angle subtended by the transducer.

In some existing current profilers the decision-making for bottom detection has been based on a simple comparison between received signal amplitude and a threshold value. While performing reasonably well, these systems may produce "false bottoms" as a result of life layers, e.g., plankton, or schooling fish which offer alternative sources of acoustic reflection. Thus, it will be readily appreciated that false bottoms, located at ranges from the transducer that are less than the range to the actual bottom, lead to inaccurate range and velocity measurements.

In other sonar systems including, for instance, depth sounders, bottom mapping sonars, sidescan sonars, speed logs and correlation logs, matched filtering techniques (or equivalent correlation techniques) have been used to minimize the number of false bottoms. Matched filtering is a technique that applies a signal to a linear filter so as to statistically determine the existence of a signal of interest. The matched filter is well-known in the relevant technology and descriptions thereof can be found in "Statistical Theory of Signal Detection", Second Edition, Carl W. Helstrom, Pergamon Press, 1968, pp. 112-115, and "Modulation, Noise, and Spectral Analysis", Philip F. Panter, McGraw-Hill, 1965, pp. 730-733, which are hereby incorporated by reference.

Among the prior art, the patents to Backman, Jr. (U.S. Pat. No. 4,054,862), Morgera (U.S. Pat. No. 4,207,620) and Kits van Heyningen (U.S. Pat. No. 4,404,665) discuss the matched filter approach to bottom detection. However, these approaches compare the output of the standard matched filter with a predetermined threshold value and thus they may still detect false bottoms. In addition, none of these systems account for the principal sources of signal loss in water.

There are two major sources of signal loss that may produce errors whenever a sonar echo is compared with an absolute reference value or threshold. First, unlike electronic emissions propagating through air, sound waves traveling in water are subject to water absorption losses due to thermal effects. Second, due to signal spreading (intuitively akin to the spreading ripples which emanate from a rock thrown into a pond), the strength of the transmitted signal is inversely proportional to the square of the range. Hence, these sources of signal loss will also affect any comparison of a filtered signal with a threshold value.

Accordingly, more accurate sonar systems to detect the bottom of a body of water are desired. In particular, a sonar system that minimizes the detection of false bottoms will improve the quality of vessel and water velocities. It would be a further improvement if the sonar system could compensate for signal losses due to water absorption and spreading.

SUMMARY OF THE INVENTION

The above-mentioned needs are satisfied by the present invention which includes a system and method for bottom tracking.

In one aspect of the invention there is disclosed a method of bottom tracking, comprising the steps of: transmitting a pulse through a medium towards a reflecting surface; receiving an echo of the pulse from the reflecting surface; convolving the echo with the pulse thereby forming one or more convolution peaks on a convolution curve; processing the convolution peaks with neighboring convolution values so as to form an evaluation curve; searching for the highest peak on the evaluation curve; and comparing the highest peak to a threshold value. Furthermore, the amplitude of the echo can be compensated for the spreading loss attributed to the medium. In addition, the compensation can comprise subtracting $\log(1/R^2)$ from the logarithm of the echo amplitude. The processing step can comprise calculating a function $E=(Center-Left)+(Center--Right)$ where Center is the value at the center of the peak, Left is a neighboring convolution value to the left of the Center, and Right is a neighboring convolution value to the right of the Center. Moreover, the Left and Right values can be selected to be one transmit pulse width away from the Center value. Also, the processing step can comprise taking the second derivative of the convolution.

In another aspect of the invention there is disclosed a method of bottom tracking, comprising the steps of: transmitting a pulse through a medium towards a reflecting surface; receiving an echo of the pulse from the reflecting surface; convolving the echo with a waveform having the transmit pulse located between pulses which are inverted from the transmit pulse so as to form a convolution curve; searching for the highest peak on the convolution curve; and comparing the highest peak to a threshold value. In addition, the amplitude of the echo can be compensated for the spreading loss attributed to the medium. Furthermore, the inverted pulses can be one-half the width of the transmit pulse width. Also, the inverted pulses can be the width of the transmit pulse. Moreover, the height of the transmit pulse in the waveform can be doubled.

In yet another aspect of the invention there is disclosed a bottom tracking system, comprising: a transducer oriented to transmit a pulse towards a reflecting surface of interest and to receive an echo of the pulse; a filter connected to the transducer so as to receive a signal representing the echo from the transducer, the filter having an impulse response that is substantially the second derivative of the transmitted pulse so as to produce a filtered signal; and means for searching the filtered signal for the highest peak among a plurality of peaks, each peak representing a different reflecting surface. The system can additionally comprise means for comparing the highest peak with a threshold value so as to determine the range between the transducer and the reflecting surface of interest.

These and other objects and features of the present invention will become more fully apparent from the following description and appended claims taken in conjunction with the accompanying drawings.

BRIEF DESCRIPTION OF THE DRAWINGS

FIG. 2 is a block diagram of a preferred bottom tracking system of the present invention which is a subsystem of the current profiler shown in FIG. 1;

FIG. 5a is a waveform diagram of the second derivative of the transmit pulse of FIG. 3a;

FIG. 5b is a waveform diagram of an approximation of the signal shown in FIG. 5a;

DETAILED DESCRIPTION OF THE PREFERRED EMBODIMENTS

Reference is now made to the drawings wherein like numerals refer to like parts throughout.

Figure 1:
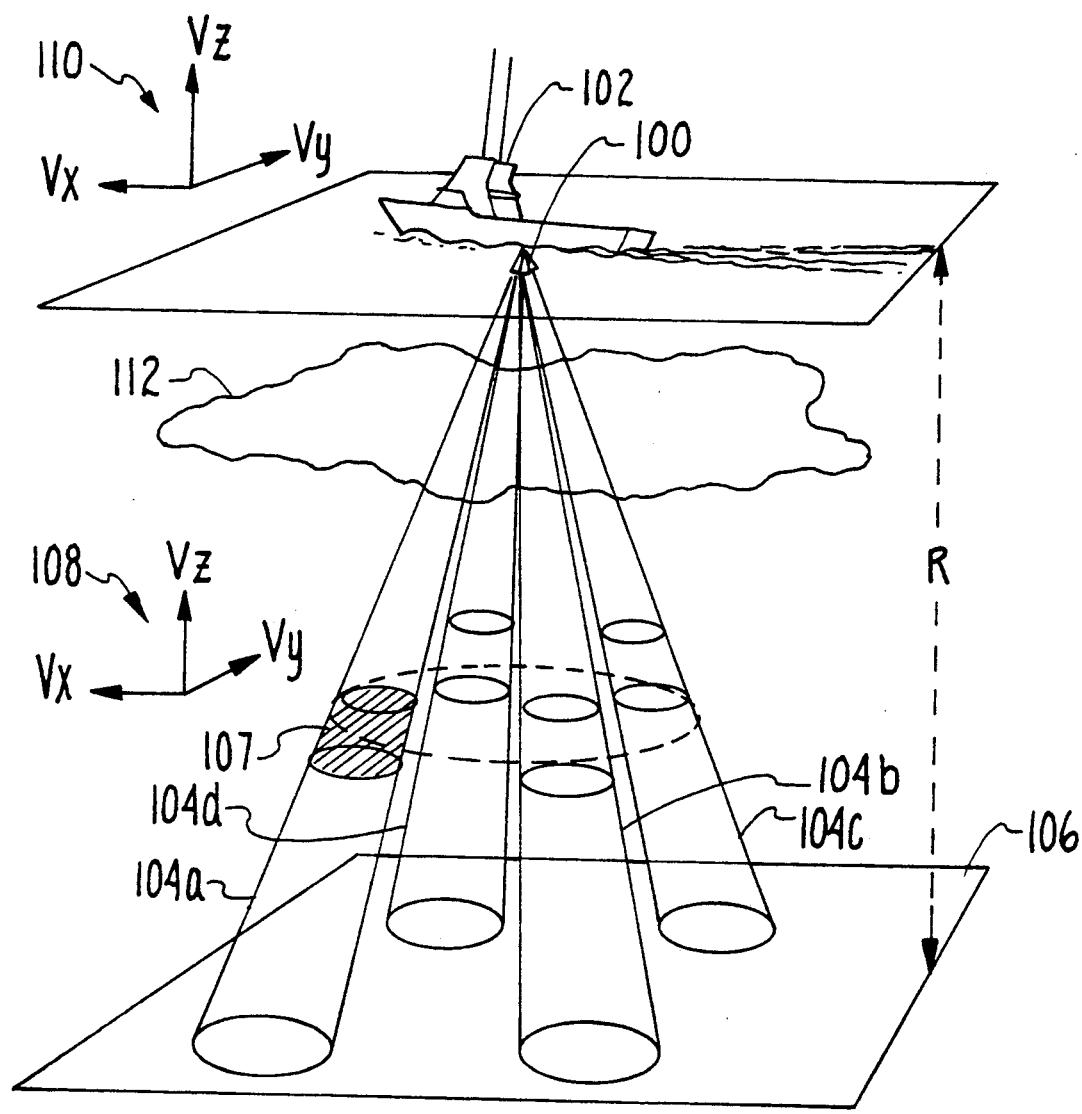
FIG. 1 is a perspective view of a downward looking current profiler having a Janus configuration of transducers, wherein the current profiler is attached to the hull of a vessel.

FIG. 1 illustrates a current profiler 100 which is attached to the hull of a moving vessel 102. The current profiler 100, as shown in FIG. 1, generates a set of acoustic beams 104a,b,c,d which emanate from transducers. The current profiler 100 is downward looking, that is, the acoustic beams 104 are directed in a generally vertical orientation towards an acoustically reflective surface such as the ocean bottom 106. Each beam 104 "illuminates" a water column which can be decomposed into horizontal slices known as range, or depth, cells such as the cell indicated at 107. By appropriate transmission and reception of sound pulses, the rate of change of a pulse can be calculated. The rate of change of the pulse is then step-by-step transformed into a Doppler frequency, a velocity along the beam 104, and then one or more orthogonal current velocity components such as those indicated at 108.

Since the vessel 102 is moving, the measured velocity of the range cell 107 is relative to the velocity of the vessel 102. Therefore, a bottom range pulse is periodically interleaved in the beams 104 to determine the orthogonal velocity components of the vessel such as those indicated at 110. The earth reference velocity of the range cell 107 is then obtained by subtracting the velocity of the vessel 102 from the measured vessel reference velocity of the range cell 107. It is important to note that in measuring the range (R) between the vessel 102 and the bottom 106, a life layer 112 such as a layer of plankton or schooling fish may also reflect the transmitted pulse with a relatively high signal strength causing detection of a "false bottom".

Although the following description refers to bottom tracking using a downward looking current profiler 100, it will be understood by one skilled in the applicable technology that other uses may be made of the present invention. For instance, the present invention could be used in an upward looking configuration to measure the movement of sheets of ice in one of the polar regions.

FIG. 2 is a block diagram of a preferred bottom tracking system 118 which is a subsystem of the current profiler 100 (FIG. 1). In an actual implementation of the current profiler 100, two or four acoustic beams are produced by independent "channels". However, since the beams are transmitted and received with nearly identical electronics, the channel for only one acoustic beam is shown in FIG. 2.

In the bottom tracking system 118 of FIG. 2, a transmitter 120 generates a transmit pulse 122. The transmit pulse 122 is a rectangular pulse of energy having a carrier frequency at the frequency of operation, 150 kHz, 300 kHz, 600 kHz or 1.2 MHz, for example.

The transmit pulse 122 is fed to a transmit/receive switch 124 which is selected to transmit. The transmit/receive switch 124 feeds the transmit pulse 122 to a transducer 126. The transducer 126 is a plate of piezoelectric material such as ceramic which is tuned to vibrate at the frequency of operation. Therefore, the radio frequency (RF) energy of the transmit pulse 126 causes the transducer 122 to generate the acoustic beam 104 into the water.

The direction of sound propagation in the acoustic beam 104 is typically about 30 degrees from the vertical. The acoustic beam 104 outlines the path of an acoustic pulse 128 which broadens with increasing range. The acoustic pulse 128 must be wide enough to fully ensonify the bottom. To fully ensonify the bottom, the pulse width (PW) must satisfy the following condition:

$$PW > 2R\ BW\ tan(\theta)/c \qquad (2)$$

where,
R is the range to the bottom;
BW is the beam width in radians;
$\theta$ is the beam angle from the vertical; and
c is the speed of sound in water.

To initialize the pulse width of the bottom tracking system 118, the range (R) of equation (2) is initially set to a predetermined estimated range. Thereafter, the estimated range becomes either the previously measured range or an average of such ranges. This estimation of the pulse width works sufficiently well to accommodate most underwater bottoms which, statistically, have gradual changes in their topographies.

After the transducer 126 generates the acoustic pulse 128, the transmit/receive switch 124 is selected to receive. The echo of the acoustic pulse 128 is a continuous signal since scattering layers of inhomogeneities (or life layers) in the water reflect the pulse 128 at all ranges between the transducer 126 and the bottom 106 (FIG. 1). The acoustic echo is received by the transducer 126 and the RF input signal generated by the transducer 126 in response to the echo is fed to the transmit/receive switch 124 and therefrom to an amplifier 130. The amplified input signal is fed from the amplifier 130 to a velocity estimator 132 which continuously estimates the velocity along the acoustic beam 104. The velocity estimator 132 is a typical component of a current profiler that is preferably implemented in software. One example of a velocity estimator 132 would include the pulse-pair algorithm which is well-known in the technology. The estimated velocity can be that of the water (i.e., scattering layers therein), a life layer 112 (FIG. 1) or the bottom 106.

The estimated velocity is received by a velocity selector 134. The velocity selector 134, preferably implemented in software, accumulates estimated velocities in a data structure, such as an array, that is indexed by range. The velocity selector 134 outputs one of these estimated velocities as a bottom velocity which can then be used to find the earth reference velocity of water currents. The proper selection of one velocity from many by the velocity selector 134 is based on a bottom range that depends on the accurate detection of the bottom 106 (FIG. 1) which is more fully discussed below.

The amplifier 130 also generates a "log envelope" signal which is fed to an envelope sampler 136. As is well-known in the relevant technology, an envelope signal is detected by tracking the peaks of an amplitude modulated signal, such as the echo signal. Such an envelope approximates the modulation on the carrier signal by means of asynchronous demodulation. The log, or logarithm, envelope can be defined as the signal resulting from compressing the envelope signal by a logarithmic function. The log envelope signal is used by the bottom tracking system 118 for two principal reasons. First, the logarithm function suppresses the dynamic range of the signal thereby limiting signal distortion. Second, the logarithm function produces a signal that reduces the nonlinear effect of water absorption.

The log envelope signal is thus fed from the amplifier 130 to an envelope sampler 136 where the signal is digitally sampled using an analog-to-digital (A/D) convertor (not shown) and then buffered with a first-in-first-out (FIFO) buffer (not shown). The sampled signal is then fed to a bottom detector/estimator 138. The bottom detector/estimator 138 functions to determine whether the sampled echo signal, as received from the envelope sampler 136, includes a bottom echo and, if so, the location of the bottom echo in the echo signal or equivalently, the range to the bottom. The bottom detector/estimator 138 of the present invention will thus be further discussed below.

The range output of the bottom detector/estimator 138 is used by the velocity selector 134 to determine which velocities, as received from the velocity estimator 132, are from the bottom. Hence, in one preferred embodiment, the ranges received from the bottom detector/estimator 138 are used to index an array of velocities that are stored in the velocity selector 134 as a function of range. These velocities are then averaged by the velocity selector 134 which outputs an average bottom velocity. The output of the bottom detector/estimator 138 may also be directly tapped, as shown in FIG. 2, for the purposes of depth finding or navigation, for example.

Figure 3A:
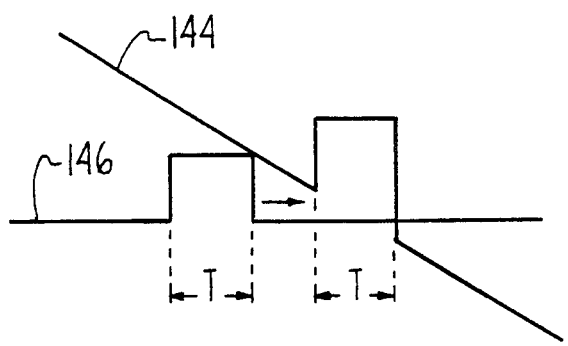
FIGS. 3a, 3b and 3c are waveform diagrams showing idealized signals used in the matched filtering and evaluation techniques of the present invention.

FIG. 3a shows an idealized log envelope signal 144 that would be received by the bottom detector/estimator 138 (FIG. 2) of the present invention. Here, in FIG. 3a, the x-axis represents time (or range) and the y-axis represents amplitude. Prior to filtering, the log envelope signal 144 is preferably compensated for spreading loss by subtracting log(1/R²). However, the compensated signal retains the same general shape as the signal 144 so this signal may also be referred to as the compensated signal 144.

The compensated signal 144 can be filtered by a matched filter (not shown) that convolves the signal 144 with a matched transmit pulse 146. The convolution of the matched filter essentially slides the matched transmit pulse 146 across the compensated signal 144 as indicated by the arrow, continuously integrating or summing the product of the signals 144, 146. Although only one echo peak is shown in the log envelope signal 144, as represented by the square wave, it should be understood that the medium in which the sound propagates, namely water, will continuously reflect the acoustic pulse 128 (FIG. 2) to a certain extent causing many echo peaks of varying heights to be formed on the signal 144. In some cases, the echo peaks caused by life layers 112 (FIG. 1) will be of greater amplitude than the echo peak resulting from the bottom 106.

Figure 3B:
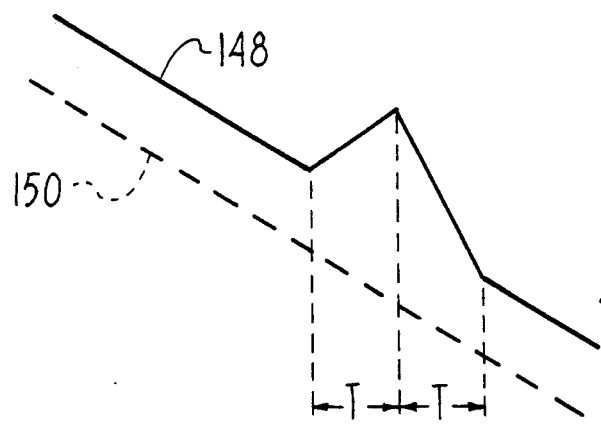

The result of the matched filter is shown as a filtered signal 148 in FIG. 3b. Of course, the convolution peak, or triangular pulse, will be one among many, each peak indicating a potential bottom. The problem then becomes to discriminate among the various false bottoms and the actual bottom. In many prior art bottom detection systems, the system stops at this point and searches a filtered signal (that has not been compensated for spreading loss) for the highest peak that is greater than a threshold value, declaring the range where the peak is found to be the bottom. However, the highest peak cannot be guaranteed to be the bottom since the effects of spreading and water absorption attenuate the echo as range increases. Hence, the actual bottom peak, at a longer range, may appear relatively weak compared to a false bottom peak, at a shorter range, that results from, say, a life layer reflecting a stronger transmit pulse.

A logarithm absorption curve 150 representing the logarithmic effect of water absorption on the amplitude of the filtered signal 148 is shown in FIG. 3b. Water absorption causes a nonlinear loss in an acoustic signal. Thus, the logarithm absorption curve 150 shows a linear loss of amplitude with increasing range. The effect of water absorption, then, is to cause the log envelope signal 144 to decrease linearly with range, hence the filtered signal 148 shows a similar loss.

It is also known that the echo signal shows a steep drop in amplitude immediately after the bottom peak. Thus, it is important for peaks in the filtered signal 148 to be compared with neighboring amplitude values that are indicative of changes in amplitude. Therefore, the filtered signal 148 is "evaluated" by the bottom detector/estimator 138 by taking the second derivative of the signal 148 with respect to time. Geometrically, the second derivative is the rate of change of the slope of the filtered signal 148. The sharper the change in the slope of the filtered signal 148, the higher will be the peak in the second derivative.

Figure 3C:
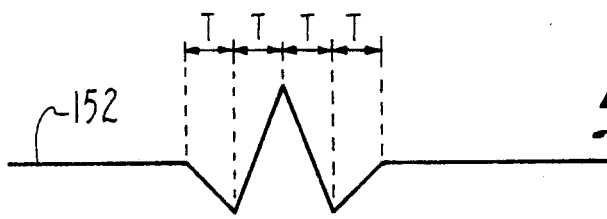

The output of this step is shown in FIG. 3c. For each triangular pulse in the filtered signal 148, an evaluated signal 152 has a characteristic "W" shape with a central peak that represents the maximum relative height of the filtered signal peak with respect to the background echo signal (or neighboring amplitude values). As it happens, the second derivative also obviates the effect of water absorption on the transmitted pulse. A search can then be performed on the evaluated signal 152 for the highest peak greater than a threshold value, and the range where the peak is found can be output by the bottom detector/estimator 138.

In a preferred embodiment, the bottom detector/estimator 138 (FIG. 2) comprises a microprocessor such as a Motorola 68000 (not shown) which executes a computer program. The sampled log envelope signal 144 (FIG. 3a) is thus digitally processed by the bottom detector/estimator 138. Of course, the bottom detector/estimator 138 could be designed completely with digital and/or analog circuitries but the flexibility derived from digital processing is presently preferred. It should also be understood that a filter having the appropriate impulse response could be used in the bottom detector/estimator 138.

Figure 4:
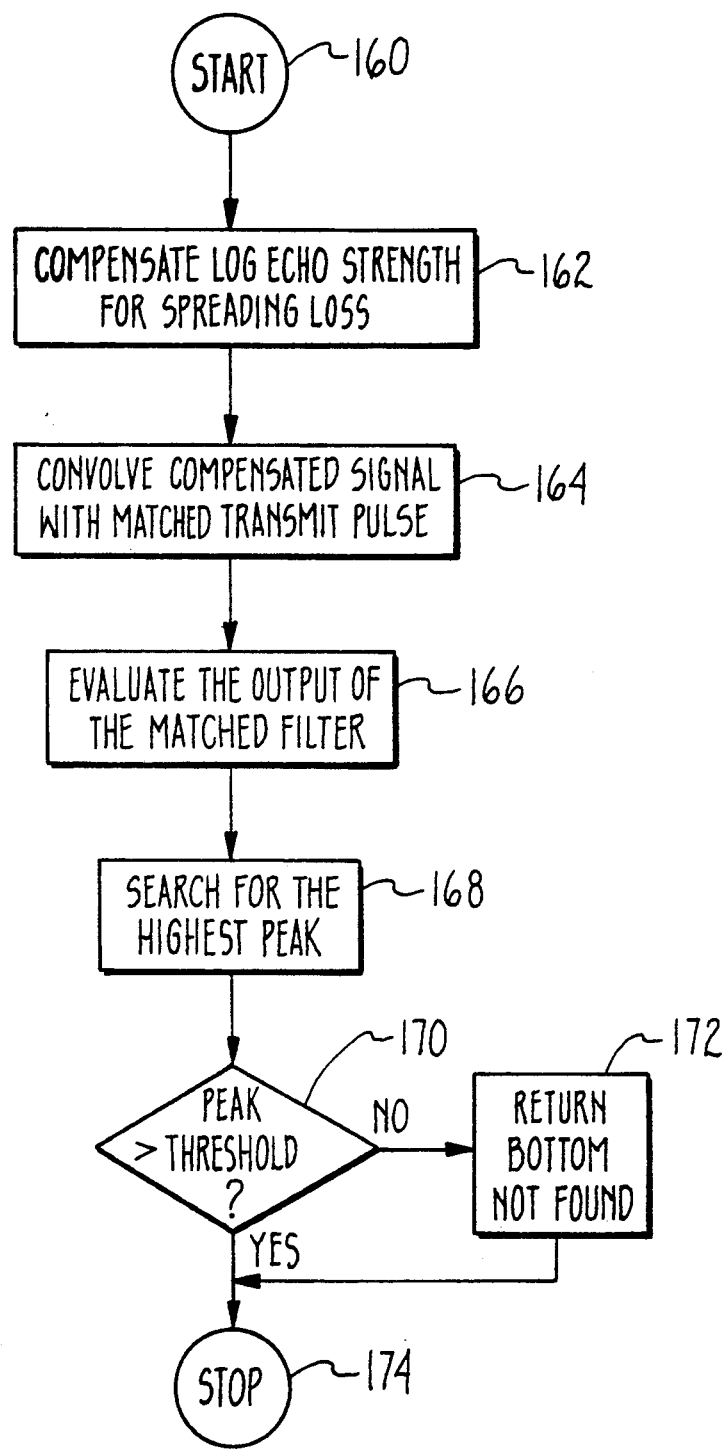
FIG. 4 is a flow diagram of one preferred embodiment of the bottom tracking method of the present invention.

One preferred bottom tracking method, or bottom tracker, which would be implemented as a computer program in the bottom detector/estimator 138 is shown in FIG. 4. At a start state 160 the bottom tracker begins execution. Moving to the next state 162, the bottom tracker compensates the log envelope signal 144 (FIG. 3a) for spreading loss by subtracting $\log(1/R^2)$, where R is the range of the echo. At a state 164, the compensated signal is convolved with a matched transmit pulse 146 (FIG. 3a). The output of the state 164, the filtered signal 148 (FIG. 3b), is then evaluated in state 166 according to the following approximation of the second derivative:

$$E = (\text{Center} - \text{Left}) + (\text{Center} - \text{Right}) = \quad (3)$$

$$2(\text{Center}) - \text{Left} - \text{Right}$$

where,
Center is the center, or peak, of a triangular pulse;
Left is the left side of the peak (e.g., one transmit pulse width to the left of the peak); and
Right is the right side of the peak (e.g., one transmit pulse width to the right of the peak).

The evaluated signal 152 (FIG. 3c) output by state 166 is then passed to a state 168. At the state 168, the bottom tracker searches the evaluated signal 152 for the highest peak. This can be accomplished by successive comparison with the greatest peak found up to a certain point. The bottom tracker then takes the result of the state 168 and compares the highest peak to a predetermined threshold at a decision state 170. This threshold is chosen such that there is an application specific balance between the probability of false detection and the probability of no detection. An example of a threshold that works reasonably well in many applications is 18 dB. If the result of the comparison at state 170 is that the peak is not greater than the threshold, then the bottom tracker moves to a state 172 to return the condition that a bottom was not found. Otherwise, if a satisfactory peak was found at state 170, then the bottom tracker continues. From either state 170 or 172, the bottom tracker terminates at a stop state 174 where the range of the highest peak found may be obtained.

Figure 5A:
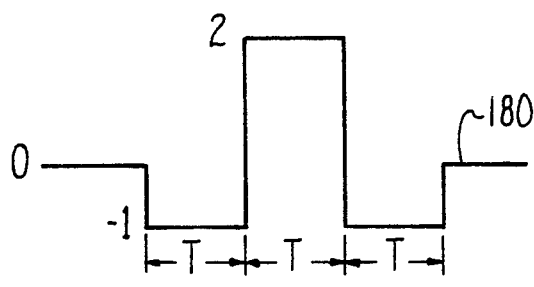

Turning now to FIG. 5a, another embodiment of the bottom tracker in the bottom detector/estimator 138 (FIG. 2) makes use of a filter having an impulse response that is the second derivative of the transmit pulse to essentially combine the convolution and evaluation states 164, 166 (FIG. 4) in a single state. In this other embodiment, a preselected signal 180 is convolved with the log envelope signal 144 (FIG. 3a), where T indicates the time of one transmit pulse. The signal 180 is ideally the second derivative of the bottom echo, which is turned end for end for the convolution. However, since the bottom echo is substantially symmetrical, it is not necessary to turn the signal 180. There is a small range extension at large ranges, that makes it desirable to increase T as the bottom range increases. This range extension, which is used at all ranges but is more significant at larger ranges, is the same as the minimum pulse width necessary to fully ensonify the bottom which was defined in equation (2). Using the signal 180 in a filter is equivalent to filtering the log envelope signal 144 (FIG. 3a) with a matched filter and then taking the second derivative of the result as previously discussed with respect to FIGS. 3 and 4. A signal 182 shown in FIG. 5b is an approximation to the signal 180 that allows somewhat greater computation speed by the bottom tracker.

Both signals 180, 182 have the characteristic that when convolved with a linear function of the form, $y = mx + b$, the convolution is zero. Such a result is desirable because it eliminates the concern over offsets in the electronics and the necessity of compensating for water absorption.

Figure 5B:
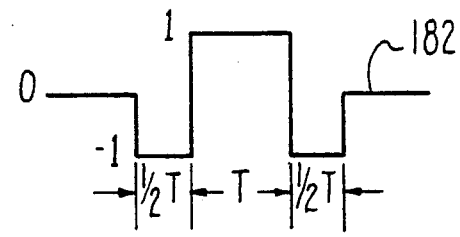
Figure 6:
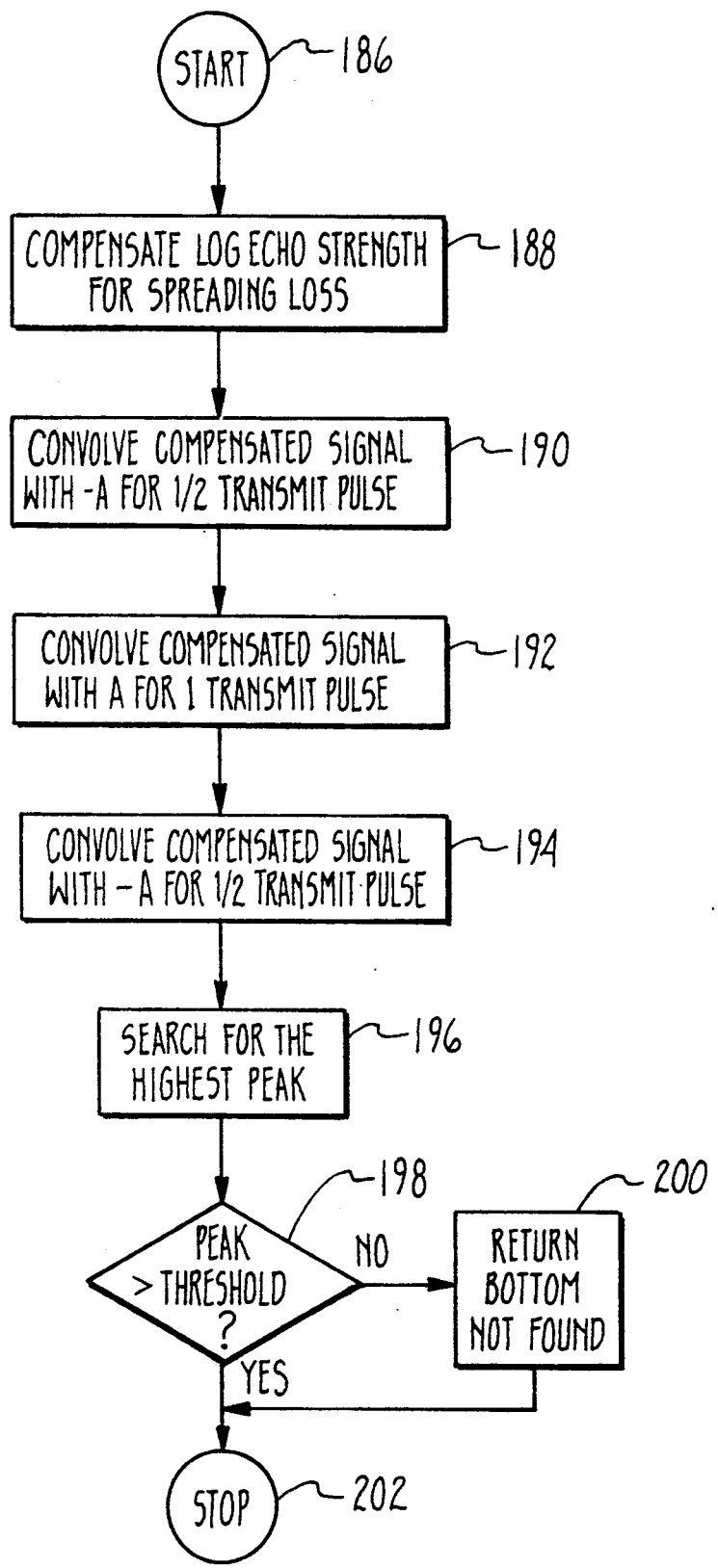
FIG. 6 is a flow diagram of another preferred embodiment of the bottom tracking method wherein matched filtering and evaluation are performed in a single operation.

FIG. 6 illustrates a preferred bottom tracker which uses the signal 182 shown in FIG. 5b for filtering. The bottom tracker begins at a state 186 and moves to state 188 to carry out the compensation for spreading loss as previously discussed with respect to the state 162 of FIG. 4. The combination of convolution and evaluation states 164, 166 (FIG. 4) that results from using the waveform 182 has been split up into three discrete states 190, 192, 194 for the purpose of this discussion. At the state 190, the bottom tracker convolves the compensated log envelope signal 144 (FIG. 3a) with a negative pulse amplitude for one-half of a transmit pulse. At the subsequent state 192, the signal 144 is convolved with the amplitude of the transmit pulse for one complete pulse width. Lastly, the signal 144 is convolved with a negative pulse amplitude for one-half of a transmit pulse. Thus, collectively, states 190, 192, 194 account for the convolution of the signal 144 with the signal 182 that is a second derivative approximation of the matched transmit pulse. Moving to state 196 the bottom tracker searches for the highest peak in the evaluated signal as previously discussed. After the decision state 198, comparing the peak amplitude to a threshold amplitude, the bottom tracker either successfully terminates at the stop state 202 or returns the bottom not found condition at state 200 and then terminates at the stop state 202. The bottom detector/estimator 138 then makes available the range of the highest peak found.

A source code listing of a Pascal program to accomplish the bottom tracking method defined by the flow diagram in FIG. 6 is shown in the attached Appendix. The method shown in the appendix does not include the final step of comparing the highest peak value of each beam against a threshold value. However, when similar code is installed in a sonar system, this comparison step is performed immediately after the termination of the "FindTheBottom" procedure listed in the Appendix.

Figure 7:
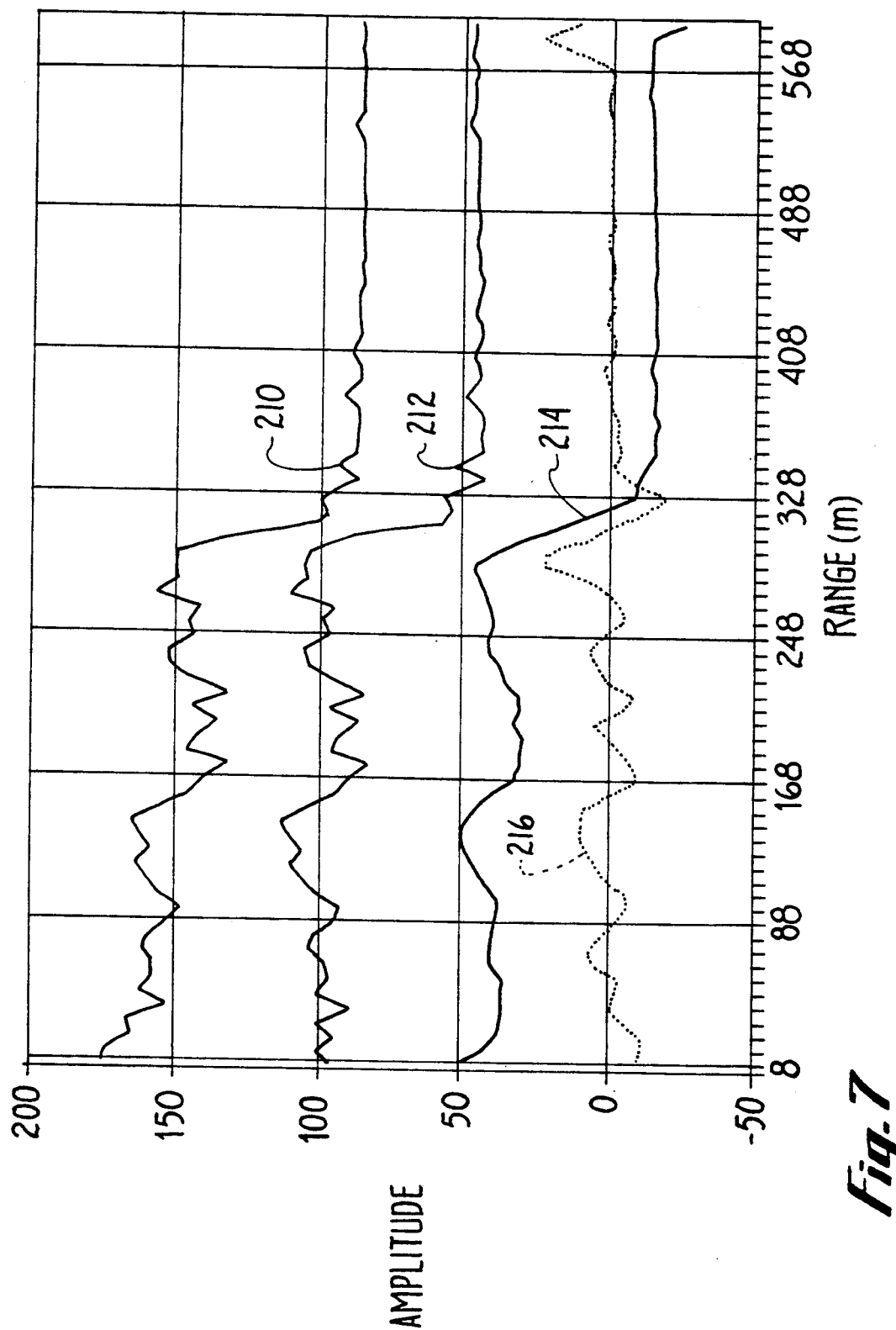
FIG. 7 is a waveform diagram of the received signal, the compensated signal, the convolved signal and the evaluated signal which are processed in the bottom tracking system shown in FIG. 4.

FIG. 7 graphically illustrates the performance of the present bottom tracking system according to the present invention. The raw data for a log envelope signal 210 was obtained from pinging the ocean bottom at a point about 10 miles off the coast from San Diego, Calif. The log envelope signal 210 was then compensated for spreading loss as discussed above. A compensated signal 212 is plotted by offsetting 40 units from the actual data to separate it from the other plots. A filtered signal 214, filtered with a matched transmit pulse 146 (FIG. 3a) is similarly offset from the actual data by 60 units. An evaluated signal 216 is also shown in FIG. 7.

It is of particular interest to note that without the evaluation step, the bottom tracking system 118 (FIG. 2) would output the range of a false bottom, i.e., the highest peak, at about 136 meters. However, after evaluation the range of the actual bottom is properly indicated to be at about 288 meters.

It has thus been shown that the present bottom tracking invention provides a benefit of minimizing the detection of false bottoms. In addition, the present invention compensates for signal losses due to water absorption and spreading, thereby reducing errors in range detection and velocity measurement. Thus, more accurate vessel and water velocities can be provided by using the bottom tracking system described herein.

Although the present invention has been shown and described in conjunction with a current profiler, one skilled in the pertinent technology will comprehend that other types of sonar systems may benefit from the bottom tracking system and method disclosed herein.

While the above detailed description has shown, described and pointed out the fundamental novel feature of the invention as applied to various embodiments, it will be understood that various omissions and substitutions and changes in the form and details of the device illustrated may be made by those skilled in the art, without departing from the spirit of the invention.

UNIT BTCRLT;

INTERFACE                                          APPENDIX

USES ADCP_COM, ADCP_CAL, DCODEBUF;

CONST
    BeamAngle   =     30;  (* Degrees *)
    dBperCount  =     0.45;

(*
    DepthHistoryChange = 2;
    AgcMaxThreshold    = 250;
    AgcMinThreshold    = 170;
*)

VAR
    Filter,
    Error,
    Range   :ARRAY [0..127,0..3] OF INTEGER;

PeakBin,
    DepthHistory       :ARRAY [0..3] OF INTEGER;

```
  Constant1,
  Constant2,
  Theta                  :REAL;

PROCEDURE InitializeBottomTrack;
procedure FindTheBottom;

IMPLEMENTATION

PROCEDURE InitializeBottomTrack;
BEGIN
  FILLCHAR(DepthHistory,SIZEOF(DepthHistory),0);
  Theta := BeamAngle*PI/180;
  Constant1 := 10/(dBperCount * LN(10));
  Constant2 := LN(COS(Theta));
END;

PROCEDURE SphericalSpreadingCorrection;
VAR
  Bin,
  Beam,
  Temp           :INTEGER;
  AgcPointer     :LONGINT;
  TempReal       : real;

BEGIN
  AgcPointer := HeaderLength + LeaderLength + VelocityLength + PeriodLength+1;
  FOR Bin := 0 TO Q DO
  BEGIN
    Temp := (Bin+1)*BinLength;
    if Temp <= 0 then Temp := 1;

TempReal := Constant1*(2*LN(Temp)); (*-Constant2;*)
    if (TempReal > 8192) or (TempReal < -8192) then TempReal := 0;
    Temp := round(TempReal);
    FOR Beam := 0 TO 3 DO
    BEGIN
      Filter[Bin,Beam] :=
              Adcp_Ensemble[AdcpNumber,AgcPointer+Beam+4*Bin] + Temp;

Range[Bin,Beam] := Filter[Bin,Beam];
    END;
  END;
END;

PROCEDURE SumFilter;
VAR
  Bin,
  Beam,
  Temp1,
  Temp2,
  LastBin,
  BinCount    :INTEGER;

PeakValue   :ARRAY[0..3] OF INTEGER;

BEGIN
  FILLCHAR(PeakBin,SIZEOF(PeakBin),0);
  FILLCHAR(PeakValue,SIZEOF(PeakValue),0);
  LastBin := Q-2*(TransmitBins);
  FOR Bin := 0 TO LastBin DO
  BEGIN
    FOR Beam := 0 TO 3 DO
    BEGIN
      BinCount := 0;
      Filter[Bin,Beam] := - Filter[Bin,Beam];
      Temp2 := BinCount;

FOR Temp1 := 1 TO HalfTransmitBins - 1 DO
```

```
BEGIN
   Filter[Bin,Beam] := Filter[Bin,Beam]
                     - Filter[Bin+Temp1 + Temp2,Beam];
   BinCount := BinCount + 1;
END;

Temp2 := BinCount;
FOR Temp1 := 1 TO TransmitBins DO
BEGIN
   Filter[Bin,Beam] := Filter[Bin,Beam]
                     + Filter[Bin+Temp1+Temp2,Beam];
   BinCount := BinCount + 1;
END;
Temp2 := BinCount;

FOR Temp1 := 1 TO HalfTransmitBins DO
BEGIN
   Filter[Bin,Beam] := Filter[Bin,Beam]
                     - Filter[Bin+Temp1+Temp2,Beam];
   BinCount := BinCount + 1;
END;

IF (TransmitBins AND 1) = 1
THEN Filter[Bin,Beam] := Filter[Bin,Beam] - Filter[Bin+BinCount+1,Beam];
      IF Filter[Bin,Beam] > PeakValue[Beam] THEN
         .BEGIN
            PeakValue[Beam] := Filter[Bin,Beam];
            PeakBin[Beam] := Bin;
         END;
      END;
   END;
END;

procedure FindTheBottom;
begin

SphericalSpreadingCorrection;
   SumFilter;

end;

BEGIN
END.
```

What is claimed is:

1. A method of bottom tracking, comprising the steps of:
   transmitting a pulse through a medium towards a reflecting surface;
   receiving an echo of the pulse from the reflecting surface;
   convolving the echo whit the pulse thereby forming one or more convolution peaks on a convolution curve;
   processing the convolution peaks with neighboring convolution values so as to form an evaluation curve;
   searching for the highest peak on the evaluation curve; and
   comparing the highest peak to a threshold value.

2. The method defined in claim 1, wherein the amplitude of the echo is compensated for the spreading loss attributed to the medium.

3. The method defined in claim 2, wherein the compensation comprises subtracting $\log(1/R^2)$ from the logarithm of the echo amplitude.

4. The method defined in claim 1, wherein the processing step comprises calculating a function E=(Center−Left)+(Center−Bight) where Center is the value at the center of the peak, Left is a neighboring convolution value to the left of the Center, and Right is a neighboring convolution value to the right of the Center.

5. The method defined in claim 4, wherein the Left and Right values are selected to be one transit pulse width away from the Center value.

6. The method defined in claim 1, wherein the processing step comprises taking the second derivative of the convolution.

7. A method of bottom tracking, comprising the steps of:
   transmitting a pulse through a medium towards a reflecting surface;
   receiving an echo of the pulse from the reflecting surface;
   convolving the echo whit a waveform having the transmit pulse located between pulses which are inverted from the transmit pulse so as to form a convolution curve;
   searching for the highest peak on the convolution curve; and
   comparing the highest peak to a threshold value.

8. The method defined in claim 7, wherein the amplitude of the echo is compensated for the spreading loss attributed to the medium.

9. The method defined in claim 7, wherein the inverted pulses are one-half the width of the transmit pulse width.

10. The method defined in claim 7, wherein the inverted pulses are the width of the transmit pulse.

11. The method defined in claim 7, wherein the height of the transmit pulse in the waveform is doubled.

12. A method of bottom tracking, comprising the steps of:
- a transducer oriented to transmit a pulse towards a selected reflecting surface among a plurality of reflecting surfaces and to receive an echo of the pulse;
- a filter connected to the transducer so as to receive a signal representing the echo from the transducer, the filter having an impulse response that is substantially the second derivative of the transmitted pulse so as to produce a filtered signal; and
- means for searching the filtered signal for the highest peak among a plurality of peaks, each peak representing a different one of said reflecting surfaces.

13. The system defined in claim 12, additionally comprising means for comparing the highest peak with a threshold value so as to determine the range between the transducer and the selected reflecting surface.

14. The method defined in claim 1, wherein the transmitted pulse has a carrier frequency at the frequency of operation between about 150 kHz and 1.2 MHz.

15. A bottom tracking system, comprising:
- a transducer oriented to transmit a pulse through a medium towards a reflecting surface and to receive an echo of the pulse;
- an amplifier connected to the transducer so as to receive a signal representing the echo from the transducer, wherein a log envelope signal is generated;
- an envelope sampler connected to the amplifier, wherein the log envelope signal is sampled and then buffered; and
- a processor connected to the envelope sampler for receiving the signal, the processor including:
  - means for convolving the signal with a matched transmit pulse;
  - means for compensating the convolved signal for the effects of absorption attributed to the medium;
  - means for searching the compensated signal for a highest peak among a plurality of peaks; and
  - means for comparing the highest peak to a predetermined threshold.

16. The system defined in claim 15 wherein said processor includes means for compensating the signal for spreading loss.

* * * * *

UNITED STATES PATENT AND TRADEMARK OFFICE
CERTIFICATE OF CORRECTION

PATENT NO. : 5,122,990

DATED : June 16, 1992

INVENTOR(S) : Deines, et al.

It is certified that error appears in the above-identified patent and that said Letters Patent is hereby corrected as shown below:

```
In Claim 12, column 15, line 10 of the Patent,
change "A method of bottom tracking, comprising
the steps of:" to --A bottom tracking system,
comprising:--.
```

Signed and Sealed this

Fifth Day of October, 1993

Attest:

BRUCE LEHMAN

Attesting Officer     Commissioner of Patents and Trademarks